(12) United States Patent
Nakai et al.

(10) Patent No.: US 12,240,200 B2
(45) Date of Patent: Mar. 4, 2025

(54) METAL-FIBER REINFORCED RESIN MATERIAL COMPOSITE

(71) Applicant: NIPPON STEEL CORPORATION, Tokyo (JP)

(72) Inventors: Masako Nakai, Tokyo (JP); Masaharu Ibaragi, Tokyo (JP); Noriyuki Negi, Tokyo (JP); Masafumi Usui, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/625,240

(22) PCT Filed: Aug. 28, 2020

(86) PCT No.: PCT/JP2020/032685
§ 371 (c)(1),
(2) Date: Jan. 6, 2022

(87) PCT Pub. No.: WO2021/039994
PCT Pub. Date: Mar. 4, 2021

(65) Prior Publication Data
US 2022/0250355 A1 Aug. 11, 2022

(30) Foreign Application Priority Data

Aug. 29, 2019 (JP) ................................ 2019-156828

(51) Int. Cl.
*B32B 15/095* (2006.01)
*B32B 5/02* (2006.01)
(Continued)

(52) U.S. Cl.
CPC .............. *B32B 15/095* (2013.01); *B32B 5/02* (2013.01); *B32B 7/12* (2013.01); *B32B 15/082* (2013.01);
(Continued)

(58) Field of Classification Search
CPC .............. B32B 15/18; B32B 2260/021; B32B 2605/08; B32B 7/12; B32B 2262/106; B62D 29/005
See application file for complete search history.

(56) References Cited

U.S. PATENT DOCUMENTS

2011/0274897 A1* 11/2011 Dauner .................... B27N 3/12
428/209
2015/0275382 A1* 10/2015 Urayama ............... C25D 13/12
205/224
(Continued)

FOREIGN PATENT DOCUMENTS

JP 62-160901 A 7/1987
JP 62-199501 A 9/1987
(Continued)

*Primary Examiner* — Alicia J Weydemeyer
(74) *Attorney, Agent, or Firm* — Birch, Stewart, Kolasch & Birch, LLP

(57) ABSTRACT

To provide a metal-fiber reinforced resin material (FRP) composite having a good appearance even when used as an automobile outer panel and not deformed even after a coating and baking process. The metal-FRP composite of the invention has a laminated structure of three or more layers, having at least a metal layer, a fiber-reinforced resin material layer holding a reinforced fiber material in a layer constituted by a matrix resin, and a resin layer located between the metal layer and the fiber-reinforced resin material layer. The resin layer is a layer constituted by a room temperature curing adhesive or by a predetermined resin and the room temperature curing adhesive. An elastic modulus E of the resin layer is more than 0.1 MPa and 1000 MPa or less, and a thickness of the resin layer is 0.005 times or more and less than 7.500 times a thickness of the metal layer.

9 Claims, 6 Drawing Sheets

(51) Int. Cl.
<table>
<tr><td>B32B 7/12</td><td>(2006.01)</td></tr>
<tr><td>B32B 15/082</td><td>(2006.01)</td></tr>
<tr><td>B32B 15/09</td><td>(2006.01)</td></tr>
<tr><td>B32B 15/18</td><td>(2006.01)</td></tr>
<tr><td>B32B 15/20</td><td>(2006.01)</td></tr>
<tr><td>B32B 27/12</td><td>(2006.01)</td></tr>
<tr><td>B32B 27/30</td><td>(2006.01)</td></tr>
<tr><td>B32B 27/36</td><td>(2006.01)</td></tr>
<tr><td>B32B 27/40</td><td>(2006.01)</td></tr>
</table>

(52) U.S. Cl.
CPC ............. *B32B 15/09* (2013.01); *B32B 15/18* (2013.01); *B32B 15/20* (2013.01); *B32B 27/12* (2013.01); *B32B 27/302* (2013.01); *B32B 27/308* (2013.01); *B32B 27/36* (2013.01); *B32B 27/40* (2013.01); *B32B 2250/03* (2013.01); *B32B 2260/021* (2013.01); *B32B 2260/046* (2013.01); *B32B 2274/00* (2013.01); *B32B 2307/54* (2013.01); *B32B 2307/732* (2013.01); *B32B 2605/08* (2013.01)

(56) References Cited

U.S. PATENT DOCUMENTS

2016/0347377 A1\* 12/2016 Minei ................. C08J 5/12
2021/0187908 A1    6/2021 Ibaragi et al.

FOREIGN PATENT DOCUMENTS

| JP | 2010-149350 A | 7/2010 |
| JP | 2012-515667 A | 7/2012 |
| JP | 2015-196326 A | 11/2015 |
| JP | 2016-221999 A | 12/2016 |
| JP | 2018-140637 A | 9/2018 |
| JP | 2019-77199 A | 5/2019 |
| WO | WO 2019/132043 A1 | 7/2019 |

\* cited by examiner

METAL-FIBER REINFORCED RESIN MATERIAL COMPOSITE

TECHNICAL FIELD

The present invention relates to a metal-fiber reinforced resin material composite.

BACKGROUND ART

To meet both the need for lighter weight and improved safety in automobiles, automotive materials combining a metal material and carbon fiber-reinforced plastic (CFRP) have been developed. In the case of using CFRP alone as an automotive member, there are issues in using existing automobile manufacturing facilities set up for a metal member, as well as problems with, for example, CFRP processability, compressive strength, brittleness, and cost. Therefore, the combination of the metal member and CFRP is expected to solve these problems, and most of the materials have a structure of a metal plate and CFRP laminated together. The combination of such a metal member and CFRP enables development of superior materials that cannot be achieved either the metal member or CFRP alone.

Focusing on an automobile manufacturing process, processes prepared for the metal member generally include a coating process where electrodeposition coating is applied to a surface of an automotive raw material and a baking process where the electrodeposition coating is baked. When the automotive material, which is made by laminating the metal material and CFRP with an adhesive, goes through the above processes, the adhesive is cured in the baking process.

However, heating in the baking process causes volume changes with different linear expansion coefficients between the metal material and CFRP, and the adhesive cures in such a state. Therefore, thermal strain caused by the linear expansion coefficient difference occurs after cooling down to room temperature, and thermal stress generated between the different materials causes deformation of the entire material, such as warpage and unevenness. As a result, when the material is used, for example, as an outer panel of an automobile, an appearance of the automobile is damaged, and there is a possibility that sufficient adhesive strength cannot be secured due to the stress applied to an adhesive interface.

For example, Patent document 1 described below proposes a technology where an intermediation layer made of a thermoplastic elastomer layer is provided between a metal layer and a fiber-reinforced plastic (FRP, also referred to as fiber-reinforced resin material) layer, and the intermediation layer adjusts a thermal stress difference by subjecting these layers to thermocompression bonding in one step.

Patent Document 2 proposes that an outer edge portion of a metal outer panel is subjected to a hemming process and the processed portion is bonded to a CFRP inner panel with an adhesive that cures at room temperature.

PRIOR ART DOCUMENT

Patent Document

[Patent Document 1] Japanese Translation of PCT International Application Publication No. 2012-515667
[Patent Document 2] Japanese Laid-open Patent Publication No. 2015-196326

DISCLOSURE OF THE INVENTION

Problems to be Solved by the Invention

However, when the inventors conducted experiments using a strip specimen referring to the above patent documents, they found that when the strip specimen was exposed to an atmosphere at 180° C. for 20 minutes, which was a condition of a coating and baking process, the strip specimen, which was taken out of the atmosphere still had deformation in many cases, although the deformation was improved compared to that of a simply bonded material.

The inventors considered factors why the deformation could not be suppressed as described above and found that when the strip specimen fabricated under conditions of Patent Document 1 was exposed to the severe environment at 180° C. for 20 minutes, some or most of the thermoplastic elastomer leaked out of the specimen, resulting in that the thermal stress adjustment effect of the thermoplastic elastomer was diminished, and material deformation occurred. Patent Document 1 describes that it is intended to solve the problem of automotive surface parts. However, Patent document 1 does not mention the coating and baking process, and there is no mention of flow of the thermoplastic elastomer layer under the harsh environment at 180° C. for 20 minutes.

On the other hand, Patent Document 2 relates to a bonded panel capable of suppressing deformation in a room temperature state even when coating-baking is performed by bonding the outer edge portion with a room temperature curing adhesive, thereby preventing generation of thermal stress during the bonding process that occurs when a thermosetting adhesive is used. However, the method of Patent Document 2 differs from the present invention, which is described in detail below, in a form of bonding.

The method described in Patent Document 2 is a manufacturing method where the outer edge portion of the metal outer panel is subjected to the hemming process and the processed portion is bonded to the CFRP inner panel using the room temperature curing adhesive. In other words, the method of Patent Document 2 requires the CFRP inner panel that is almost the same shape as the metal outer panel. As mentioned earlier, CFRP has problems in terms of processability and cost, and the method of Patent Document 2 cannot take a form of locally bonding the CFRP layer to the metal layer, which can solve these problems. Further, when the adhesive is simply applied to an entire surface of the CFRP layer so that the CFRP layer is bonded to the metal layer, the adhesive will flow during the coating and baking process, and the adhesive will be cured while the metal expands. Therefore, after cooling down to room temperature, thermal stress is generated in the laminated material. This phenomenon is the same even when the room temperature curing adhesive is used. Uncured portions in the room temperature curing adhesive flow due to heating, causing the thermal stress as described above.

The present invention is made in consideration of the above problems and an object thereof is to provide a metal-fiber reinforced resin material composite that has a good appearance even when used as an automobile outer panel and is not deformed even after a coating and baking process.

Means for Solving the Problems

The inventors diligently studied conditions necessary to solve the above problems. As a result, they have found that it is effective to specify conditions for a resin layer in consideration of the fact that various materials flow during a coating and baking process, as well as to laminate different materials without generating thermal stress as much as possible using a room temperature curing adhesive that does not require heating during bonding. The conditions for the resin layer are a special range that takes into account not only the flow of the resin layer but also flowability of uncured portions of the adhesive after curing at room temperature, which cannot be achieved by simply combining materials.

A gist of the present invention completed based on the above-described findings is as follows.

[1] A metal-fiber reinforced resin material composite having a laminated structure of three or more layers, including at least a metal layer; a fiber-reinforced resin material layer holding a reinforced fiber material in a layer constituted by a matrix resin; and a resin layer located between the metal layer and the fiber-reinforced resin material layer, wherein the resin layer is a layer constituted by a room temperature curing adhesive or a layer constituted by a predetermined resin and the room temperature curing adhesive, and an elastic modulus E of the resin layer is more than 0.1 MPa and 1000 MPa or less, and a thickness of the resin layer is 0.005 times or more and less than 7.500 times a thickness of the metal layer.

[2] The metal-fiber reinforced resin material composite according to [1], wherein the elastic modulus E of the resin layer is 1 MPa or more and 500 MPa or less.

[3] The metal-fiber reinforced resin material composite according to [1] or [2], wherein the elastic modulus E of the resin layer is 10 MPa or more and 100 MPa or less.

[4] The metal-fiber reinforced resin material composite according to any one of [1] to [3], wherein the resin layer is made of a curable resin or a thermoplastic resin.

[5] The metal-fiber reinforced resin material composite according to any one of [1] to [4], wherein the room temperature curing adhesive is a room temperature curing adhesive without uncured portions.

[6] The metal-fiber reinforced resin material composite according to any one of [1] to [5], wherein the resin layer is made of the curable resin.

[7] The metal-fiber reinforced resin material composite according to any one of [1] to [6], wherein the resin layer is bonded to the metal layer with the room temperature curing adhesive.

[8] The metal-fiber reinforced resin material composite according to any one of [1] to [7], wherein the resin layer is bonded to the fiber-reinforced resin material layer with the room temperature curing adhesive.

[9] The metal-fiber reinforced resin material composite according to any one of [1] to [8], wherein the metal layer is formed by a steel material, a stainless material, a titanium material, an aluminum alloy material, or a magnesium alloy material.

[10] The metal-fiber reinforced resin material composite according to any one of [1] to [9], wherein the metal layer is formed by a steel sheet.

Effect of the Invention

As explained above, the present invention makes it possible to provide a metal-fiber reinforced resin material composite that has a good appearance even when used as an automobile outer panel and does not deform even after a coating and baking process.

MODE FOR CARRYING OUT THE INVENTION

Figure 1:
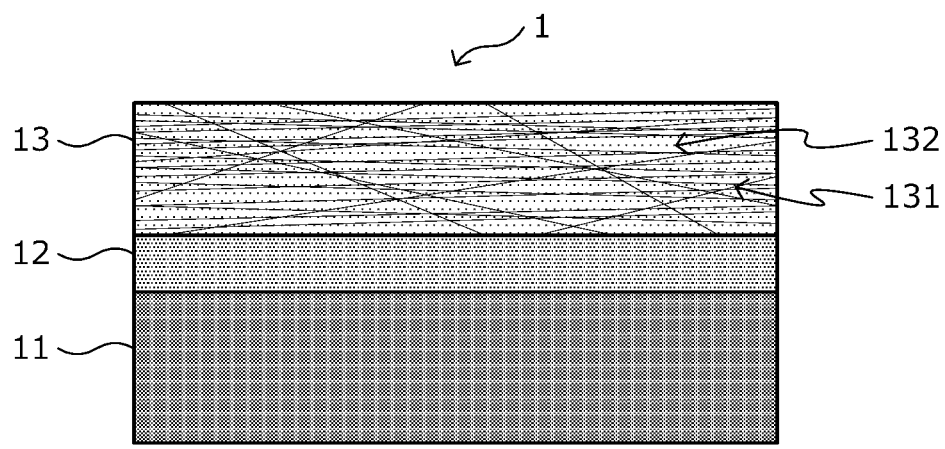
FIG. 1 is an explanatory diagram schematically illustrating an example of a cross-sectional structure of a metal-fiber reinforced resin material composite according to an embodiment of the present invention.

Hereinafter, preferred embodiments of the present invention will be explained in detail with reference to the attached drawings. In this description and the drawings, components having substantially the same functional configuration are denoted by the same reference numerals and symbols, and thus repeated explanation of these is omitted.

<Outline of Metal-Fiber Reinforced Resin Material Composite>

As mentioned earlier, the inventors have found that even in a member where a metal material and a fiber-reinforced resin material (FRP) are bonded with a room temperature curing adhesive, which is usually used to avoid thermal stress due to heating, uncured portions in the room temperature curing adhesive flow when the bonded member is heat-treated after cured at room temperature. In this case, the uncured portions of the adhesive additionally cure while the metal material expands due to the heat treatment, resulting in a misfit of thermal stress between the metal material and FRP to cause deformation of the member.

As a result of the inventors' intensive study on the above findings, it became clear that a good deformation suppression effect could not be obtained unless a resin layer with an elastic modulus within a specific range was inserted into an interface between different materials (that is, the interface between the metal material and FRP) to suppress deformation when the adhesive with uncured portions was used. The above findings regarding the resin layer are also valid when using a room-temperature adhesive without uncured portions.

Further, the inventors have found the following findings.

A resin contained in the resin layer has a higher linear expansion coefficient than a metal. Since a thermal stress of the resin layer increases with thickness, when the thickness of the resin layer is thicker than a specific range, a difference between the thermal stress of the resin layer and that of the metal material becomes too large. As a result, when the thickness of the resin layer is thicker than the specific range, deformation occurs in a metal-fiber reinforced resin material composite. The inventors have also found that when the thickness of the resin layer is thinner than the specific range, a sufficient thermal stress-relieving effect cannot be obtained.

A more concrete outline of the findings obtained by the inventors is as follows.

A metal-fiber reinforced resin material composite (hereinafter also referred to as a "metal-FRP composite") of an embodiment of the present invention, which will be described in detail below, includes at least a metal layer 11, a resin layer 12, and a fiber-reinforced resin material (FRP) layer 13, as illustrated in FIG. 1 to FIG. 4. In other words, the metal-FRP composite of the embodiment of the present invention has a laminated structure of three or more layers and has a sandwich structure, with the resin layer 12 between the metal layer 11 and the FRP layer 13.

Here, the resin layer 12 of the embodiment of the present invention may be made of a room temperature curing adhesive or may be constituted by one or more resins and the room temperature curing adhesive. That is, if the room temperature curing adhesive has an elastic modulus within a specific range after curing, it is possible to make the resin layer 12 with a room temperature curing adhesive function by inserting such a room temperature curing adhesive alone between the metal layer 11 and the FRP layer 13 within a specific thickness range. It is also possible to make the resin layer 12 constituted by one or more resins and the room temperature curing adhesive by bonding one or more resins to the metal layer 11 using the room temperature curing adhesive.

Here, the above-mentioned "room temperature curing adhesive," that is, an adhesive that cures at room temperature, refers to an adhesive that can cure without heating to bond materials. A layer created by the curing of such an adhesive may also serve as the resin layer 12. Such a room temperature curing adhesive is different from a tackiness agent, which is a substance that retains enough tacky strength to temporarily fix a target member on and does not cure over time. Concrete examples of the room temperature curing adhesive will be described later for convenience of explanation.

A material, shape, thickness, and the like of the metal layer 11 are not particularly limited as long as a forming process by pressing, for example, is possible but a thin plate shape is preferable. Examples of the material of the metal layer 11 include, for example, iron, titanium, aluminum, magnesium, and their alloys. Here, examples of the alloy include, for example, an iron-based alloy (including stainless steel), a Ti-based alloy, an Al-based alloy, and an Mg alloy. The material of the metal layer 11 is preferably a steel material, the iron-based alloy, titanium, and aluminum, and more preferably the steel material that has a higher elastic modulus than other metal species. Such steel materials include, for example, a cold-rolled steel sheet for general use, drawing use, or extra deep drawing use, a cold-rolled high strength steel sheet with improved formability for automobiles, a hot-rolled steel sheet for general use or forming use, a hot-rolled steel sheet for automobile structural use, and a hot-rolled high strength steel sheet with improved formability for automobiles, which are specified in Japanese Industrial Standards (JIS) or the like as the steel sheet in the thin plate shape used for automobiles. Carbon steel, alloy steel, high-tensile steel, and so on used for general and mechanical structural purposes can also be included as the steel materials, which are not limited to the thin plate shape.

The steel material may be subjected to any surface treatment. Examples of the surface treatment include, for example, various plating treatments such as galvanization (a hot-dip galvanized steel sheet, electrogalvanizing, and the like) and aluminum plating, conversion treatments such as chromate and non-chromate treatments, and surface roughening treatments such as physical sandblasting or chemical etching, but are not limited thereto. Plating alloying and multiple types of surface treatments may also be applied to the steel material. It is preferable that the surface treatment is at least aimed at imparting rust-prevention properties.

The surface of the metal layer 11 is preferably treated with a primer to improve adhesiveness between the FRP layer 13 and the metal layer 11. For example, a silane coupling agent and a triazine-thiol derivative are preferred as the primers to be used in this treatment. Examples of the silane coupling agent include an epoxy-based silane coupling agent, an amino-based silane coupling agent, and an imidazole silane compound. Examples of the triazine-thiol derivative include 6-diarylamino-2,4-dithiol-1,3,5-triazine, 6-methoxy-2,4-dithiol-1,3,5-triazinemonosodium, 6-propyl-2,4-dithiolamino-1,3,5-triazinemonosodium, 2,4,6-trithiol-1,3,5-triazine, and so on.

An elastic modulus E of the resin layer 12 of the embodiment of the present invention is more than 0.1 MPa and 1000 MPa or less. When the elastic modulus E of the resin layer 12 is higher than the above specific range, the resin layer 12 is difficult to deform and an effect of adjusting a thermal stress difference is small, resulting in a large deformation of the metal-FRP composite. When the elastic modulus E of the resin layer 12 is lower than the above range, using a thinner resin layer 12 seems to be effective. However, the elastic modulus of 0.1 MPa is a value that is difficult to exist as a solid and is unsuitable for use as a structural material.

A resin selected as the resin layer 12 is preferably a curable resin or a thermoplastic resin. The resin layer 12 of the embodiment of the present invention may have both a function as an elastic layer having the elastic modulus E in the specific range as described above and a function as an adhesive to bond the metal layer 11 and the FRP layer 13. Concrete examples of the resin used as the resin layer 12 will be described later for convenience of explanation.

As described in detail below, the present invention is characterized by the use of the room temperature curing adhesives during the forming of the metal-FRP composite, forming the composite without heating, and then undergoing a heat treatment process in a coating and baking process, which is different from Patent Document 1 that requires heating during forming. In Patent Document 1, an elastomer flowed due to heating during forming, and the elastomer flowed again in the subsequent coating and baking process, which reduced a deformation suppression effect. However, in the present invention, such drastic flow of the resin layer 12 does not occur because it is formed with the room temperature curing adhesive and then heated. Further, even if the resin layer 12 flows partially, the remaining resin layer 12 will be effective enough as long as a thickness range as described in detail below is satisfied.

The FRP layer 13 is a layer containing a matrix resin 132 and a reinforced fiber material 131, and a predetermined reinforced fiber material is held in the layer constituted by a predetermined matrix resin. The term "held" in this embodiment indicates a state where the reinforced fiber material 131 is combined with the matrix resin 132. Concretely, it indicates a state where "the reinforced fiber material is dispersed in the matrix resin," a state where "the resin is included in fibers arranged in a directional manner," or a state where "continuous fibers are bound by the resin," but a mode thereof is not specified and can be set as appropriate depending on a length of the fibers, directionality of the fibers, a ratio of fibers in the resin, and other factors. The matrix resin contains at least one or more types of curable resin or thermoplastic resin. In the embodiment of the present invention, there is no particular restriction on the FRP layer 13, and the effect of the present invention can be obtained as long as the FRP layer 13 has properties within an actual range to be used as part of automobile members.

Here, in the embodiment of the present invention, the curable resin used as the resin layer 12 and the matrix resin 132 is a resin that undergoes a crosslinking reaction in a heated state or at room temperature, and that does not cause the cured portion to flow or deform due to heating even if the resin is subjected to heat treatment after it is once cured. Examples of the curable resin include, for example, an epoxy-based resin, a polyurethane-based resin, a phenol-based resin, a melamine-based resin, a urea-based resin, a thermosetting polyimide-based resin, a maleimide-based resin, a vinylester-based resin, an unsaturated polyester-based resin, an unsaturated polyethylene-based resin, a cyanate-based resin, a curable elastomer, silicone rubber, and the like.

In the embodiment of the present invention, the thermoplastic resin used as the resin layer 12 and the matrix resin 132 is a resin that softens when heated to a glass transition point or melting point of the resin but solidifies when a temperature becomes lower than the glass transition point or melting point again. Examples of the thermoplastic resin include one or more types selected from, for example, a phenoxy resin; polyolefin and acid-modified polyolefin; polystyrene; polymethyl methacrylate; an AS resin; an ABS resin; polyester such as polyethylene terephthalate and polybutylene terephthalate; vinyl chloride; acrylic; polycarbonate; polyamide; polyethersulfone; polyphenyleneether and its modifications; super engineering plastics such as polyimide, polyamideimide, polyetherimide, polyetheretherketone, polyphenylene sulfide; polyoxymethylene; polyarylate, polyetherketone; polyetherketoneketone; nylon; a thermoplastic elastomer; and the like.

The reinforced fiber material of the embodiment of the present invention is a fiber that acts as a reinforced material for the FRP composite. The reinforced fiber material is not limited to any particular type of fiber, and various fiber materials can be used. Examples of the reinforced fiber material include, for example, carbon fibers, glass fibers, aramid fibers, boron fibers, silicon carbide fibers, steel fibers, PBO fibers, alumina fibers, and high-strength polyethylene fibers. For example, both PAN-based and pitch-based fibers can be used as the carbon fibers and should be selected according to the purpose and application. Further, a form of these reinforced fiber materials is not particularly limited, and for example, a nonwoven fabric base material using chopped fibers, a cloth material using continuous fibers, a unidirectional reinforced fiber base material (UD material), and the like can be used as a reinforced fiber base material serving as a base material of the reinforced fiber material.

In the embodiment of the present invention as described in detail below, a laminated structure that does not deform after the coating and baking process can be obtained similarly, even when the resin layer 12 that does not flow due to heating, or the room temperature curing adhesive without uncured portions is used.

<Detailed Description of Metal-Fiber Reinforced Resin Material Composite>

Hereinafter, the metal-FRP composite outlined above will be described in more detail with reference to FIG. 1 to FIG. 6.

Figure 2:
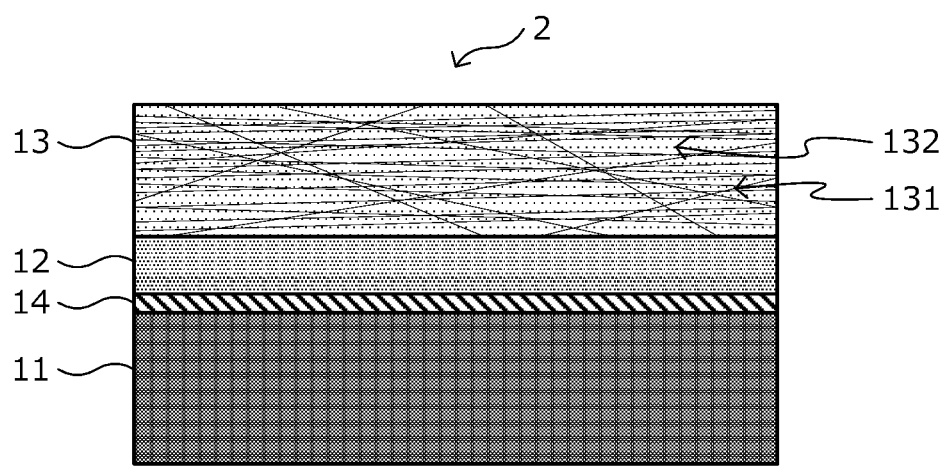
FIG. 2 is an explanatory diagram schematically illustrating an example of the cross-sectional structure of the metal-fiber reinforced resin material composite according to the embodiment of the present invention.
Figure 3:
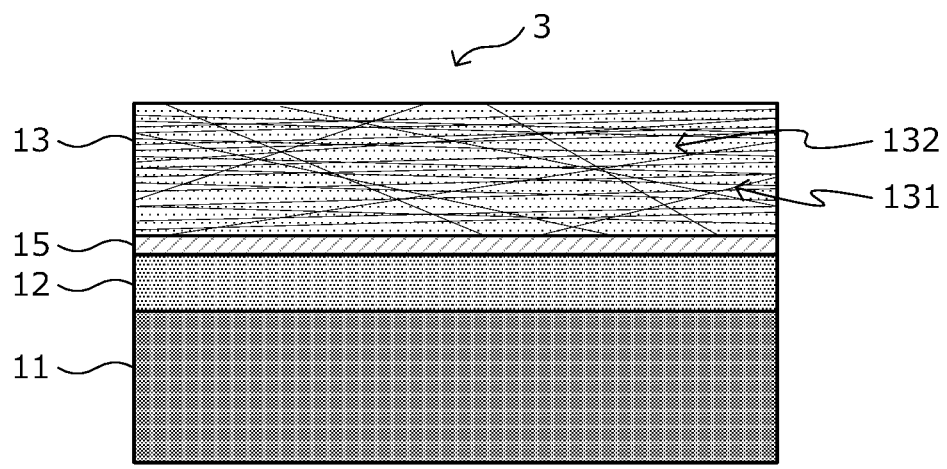
FIG. 3 is an explanatory diagram schematically illustrating an example of the cross-sectional structure of the metal-fiber reinforced resin material composite according to the embodiment of the present invention.
Figure 4:
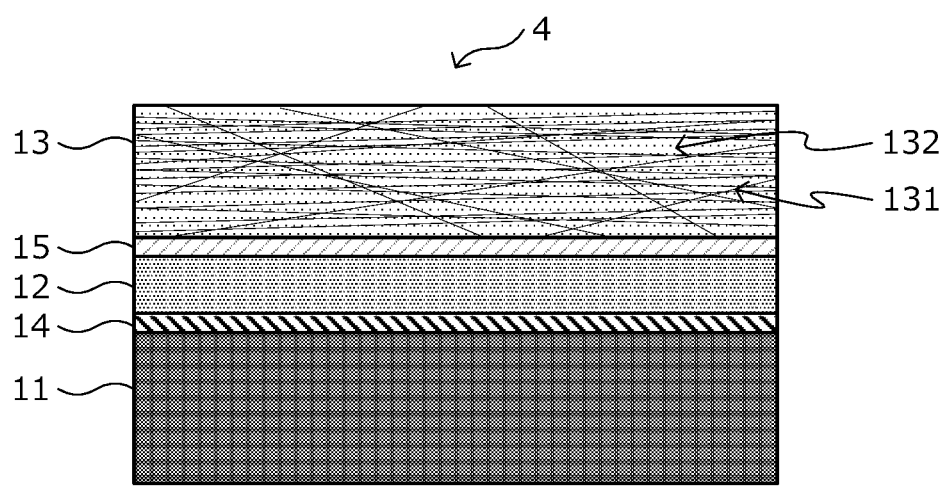
FIG. 4 is an explanatory diagram schematically illustrating an example of the cross-sectional structure of the metal-fiber reinforced resin material composite according to the embodiment of the present invention.

FIG. 1 to FIG. 4 each schematically illustrate an example of a cross-sectional structure of the metal-FRP composite according to the embodiment of the present invention. FIG. 1 illustrates a schematic cross-sectional diagram of a metal-FRP composite 1 in a three-layer structure of the embodiment of the present invention, FIG. 2 and FIG. 3 illustrate schematic cross-sectional diagrams of metal-FRP composites 2, 3 in a four-layer structure respectively, and FIG. 4 illustrates a schematic cross-sectional diagram of a metal-FRP composite 4 in a five-layer structure.

As illustrated in FIG. 1 to FIG. 4, the metal-FRP composite 1, metal-FRP composite 2, metal-FRP composite 3, and metal-FRP composite 4 each have the metal layer 11, the resin layer 12, and the FRP layer 13.

In the case of the metal-FRP composite 1 in the three-layer structure as illustrated in FIG. 1, the metal layer 11 and the FRP layer 13 are bonded by the resin layer 12. In this case, the resin layer 12 enables both a function of relieving a thermal stress misfit between the metal layer 11 and the FRP layer 13 by having the elastic modulus E in the specific range and a function of an adhesive that cures at room temperature. In other words, the example illustrated in FIG. 1 shows an example where the resin layer 12 is constituted by a room temperature curing adhesive itself having the elastic modulus E in the specific range.

Here, the adhesive that cures at room temperature is widely known as an adhesive that cures without heating and can bond materials. According to JIS Z 8703, room temperature is defined as 20° C.±15° C., and the adhesive cures without heating even in the temperature range.

In the case of the metal-FRP composite 2 in the four-layer structure as illustrated in FIG. 2, the metal layer 11 and the resin layer 12 are bonded by an adhesive layer 14 derived from the room temperature curing adhesive. In the case of the metal-FRP composite 3 in the four-layer structure as illustrated in FIG. 3, the resin layer 12 and the FRP layer 13 are bonded by an adhesive layer 15 derived from the room temperature curing adhesive. In the cases illustrated in FIG. 2 and FIG. 3, the resin layer 12 only needs to have the elastic modulus E in the specific range as described above and does not need to function as the room temperature curing adhesive.

In the case of the metal-FRP composite 4 in the five-layer structure as illustrated in FIG. 4, the resin layer 12 and the FRP layer 13 are bonded by the adhesive layer 15 in addition to the structure illustrated in the metal-FRP composite 2. In the example illustrated in FIG. 4, the resin layer 12 only needs to have the elastic modulus E in the specific range as described above and does not need to function as the room temperature curing adhesive.

In the above forms, components such as the metal layer 11, the resin layer 12, the FRP layer 13, and the adhesive layers 14, 15 according to need, which move integrally during processing and deformation, are the metal-FRP composite 1, metal-FRP composite 2, metal-FRP composite 3, or metal-FRP composite 4. In other words, in the embodiment of the present invention, the "composite" means the components where the metal layer 11, the resin layer 12, the FRP layer 13, and the adhesive layers 14, 15 according to need, which are laminated (bonded) together to be integrated. The term "integrated" means that the metal layer 11, the resin layer 12, the FRP layer 13, and further the adhesive layers 14, 15 according to need integrally move during the processing and deformation.

In the metal-FRP composite 1, metal-FRP composite 2, metal-FRP composite 3, or metal-FRP composite 4 of the embodiment of the present invention, the metal layer 11 is not particularly limited and can be made of any of the materials shown in the above outline.

The metal layer 11 may be subjected to any surface treatment as explained in the above outline. The surface treatment method is not particularly specified and may include treatment for the purpose of imparting the rust prevention properties, or the primer treatment to improve adhesiveness to the resin layer 12 and adhesive layer 14.

In the metal-FRP composite 1, metal-FRP composite 2, metal-FRP composite 3, or metal-FRP composite 4 of the embodiment of the present invention, the resin layer 12 is a layer constituted by a resin whose elastic modulus E is in the range of more than 0.1 MPa and 1000 MPa or less.

The resin layer 12 is preferably a layer constituted by a resin with the elastic modulus E of 1 MPa or more, and more preferably a layer constituted by a resin with the elastic modulus E of 10 MPa or more. When the resin layer 12 is constituted by the resin with the elastic modulus E as stated above, the thermal stress misfit between the metal layer 11 and the FRP layer 13 can be relieved more reliably.

On the other hand, the resin layer 12 is preferably a layer constituted by a resin with the elastic modulus E of 500 MPa or less, and more preferably a layer constituted by a resin with the elastic modulus of 100 MPa or less. By constituting the resin layer 12 with the layer having the elastic modulus E as stated above, the thermal stress misfit can be relieved more reliably even when bonding the FRP layer 13 with the metal layer 11 having a larger linear expansion coefficient, such as a steel material, for example.

The resin selected as the resin layer 12 may be either the curable resin or the thermoplastic resin but is particularly preferably the curable resin that is difficult to flow even at high temperature. Concrete examples of such curable resins and thermoplastic resins are described in the above outline.

In the metal-FRP composite 1, metal-FRP composite 2, metal-FRP composite 3, or metal-FRP composite 4 of the embodiment of the present invention, a thickness of the resin layer 12 is 0.005 times or more and less than 7.500 times a thickness of the metal layer 11. The thermal stress difference between the metal layer 11 and the FRP layer 13 can be relieved when the thickness of the resin layer 12 is 0.005 times or more and less than 7.500 times the thickness of the metal layer 11. On the other hand, when the thickness of the resin layer 12 is less than 0.005 times the thickness of the metal layer 11, the thermal stress difference between the metal layer 11 and the FRP layer 13 cannot be sufficiently relieved because the thickness of the resin layer 12 is too thin. When the thickness of the resin layer 12 is 7.500 times or more the thickness of the metal layer 11, a thickness of the metal-FRP composite becomes too large because the resin layer 12 is too thick, and the thermal stress difference between the resin layer and the metal material becomes too large, resulting in deformation of the metal-fiber reinforced resin material composite.

The thickness of the resin layer 12 is preferably 0.050 times or more, and more preferably 0.060 times or more the thickness of the metal layer 11. When the thickness of the resin layer 12 relative to the thickness of the metal layer 11 is within the above range, the deformation of the resin layer 12 can sufficiently relieve the thermal stress difference between the metal layer 11 and the FRP layer 13. As a result, the deformation that may occur in the metal-FRP composite due to the thermal stress difference can be suppressed more reliably. On the other hand, the thickness of the resin layer 12 is preferably 5.000 times or less, and more preferably 2.000 times or less the thickness of the metal layer 11. When the thickness of the resin layer 12 relative to the thickness of the metal layer 11 is within the above range, the effect of relieving the thermal stress difference between the metal layer 11 and the FRP layer 13 due to the resin layer 12 can be obtained while suppressing the thickness of the metal-FRP composite.

Thus, when the thickness of the resin layer 12 relative to the thickness of the metal layer 11 is within the above range, the deformation that may occur in the metal-FRP composite can be suppressed more reliably. Since the linear expansion coefficient of the FRP layer 13 is sufficiently small compared to that of the metal layer 11, the thickness of the FRP layer 13 does not need to be considered, and the thickness of the resin layer 12 relative to the metal layer 11 is important.

The FRP layer 13 is a layer containing the reinforced fiber material 131 and the matrix resin 132. As schematically illustrated in FIG. 1 to FIG. 4, the reinforced fiber material 131 is held in a layer constituted by the matrix resin 132. The reinforced fiber material 131 can be the carbon fiber, the glass fiber, the aramid fiber, the boron fiber, the silicon carbide fiber, the steel fiber, the PBO fiber, the alumina fiber, the high-strength polyethylene fiber, and other fibers, as explained in the above outline, and the form of the reinforced fiber material 131 is not restricted. The term "held" in this embodiment indicates a state where the reinforced fiber material 131 is combined with the matrix resin 132. Concretely, it indicates the state where "the reinforced fiber material is dispersed in the matrix resin," the state where "the resin is included in fibers arranged in a directional manner," or the state where "continuous fibers are bundled by the resin," but the mode is not specified and can be set as appropriate depending on a length of the fibers, a directionality of the fibers, a ratio of fibers in the resin, and other factors.

The curable resin or the thermoplastic resin can be used as the matrix resin 132. The material of the matrix resin 132 is not particularly limited as long as the resin satisfies the properties generally required as the matrix resin for FRP.

Concrete examples of the curable resin and thermoplastic resin are as exemplified in the outline above, and detailed explanations are omitted below.

The matrix resin 132 may contain, for example, natural rubber, synthetic rubber, elastomers, various inorganic fillers, solvents, extender pigments, coloring agents, antioxidants, ultraviolet inhibitors, flame retardants, flame retardant auxiliaries, and other additives within a range not impairing adhesiveness and physical properties of the matrix resin 132.

When taking the form of the metal-FRP composite 2 or metal-FRP composite 4, an adhesive is applied to either the prepared metal layer 11 or resin layer 12, or to both the metal layer 11 and resin layer 12, and the metal layer 11 and the resin layer 12 are superimposed and bonded by the adhesive layer 14. An adhesive that cures at room temperature (that is, the room temperature curing adhesive) is used for the adhesive layer 14, and the metal layer 11 and the resin layer 12 are laminated together at room temperature. The bonding between the FRP layer 13 and resin layer 12 in the form of the metal-FRP composite 3 or metal-FRP composite 4 is also similar to the above.

The room temperature curing adhesive is preferably either a mixed type room temperature curing adhesive of two or more components that are pre-mixed and uniformly diffused before application, or a one-component type room temperature curing adhesive that cures with only one component to prevent generation of uncured portions due to poor diffusion between a main agent and a curing agent. Examples of the room temperature curing adhesive include, for example, an epoxy-based room temperature curing adhesive, an acrylic-based room temperature curing adhesive, a silylated urethane-based room temperature curing adhesive, a polyurethane-based room temperature curing adhesive, a chloroprene-based room temperature curing adhesive, and a silicone-based room temperature curing adhesive. The room temperature curing adhesive can be of any type as long as it cures at room temperature without heating. However, it is preferable to use the room temperature curing adhesive without uncured portions as the room temperature curing adhesive as stated above. By using the room temperature curing adhesive without uncured portions, the generation of the thermal stress due to additional curing of the uncured portions can be more reliably suppressed, and an even better stress-relieving effect can be achieved.

Candidates for the room temperature curing adhesive without uncured portions are, for example, the one-component room temperature curing adhesive that does not allow insufficient mixing of solvents. Whether the uncured portions of the adhesive exist can be confirmed from a storage modulus E' obtained by performing a dynamic viscoelasticity measurement under the following conditions.

That is, in the dynamic viscoelasticity measurement, the storage modulus E' is identified by measuring a DTMA curve of a target substance using a dynamic thermal mechanical analysis apparatus according to JIS K7244. In this case, the storage modulus E' is measured in a nitrogen gas stream, in tensile mode, at 1 Hz, with a temperature rise of 3° C./min in a range of −100 to 200° C. A specimen is made by spreading an adhesive before curing to a thickness of 0.5 mm, allowing it to stand for 24 hours at room temperature to be cured, and then cutting it out to a width of 10 mm, a length of 40 mm, and a thickness of 0.5 mm.

Figure 5:
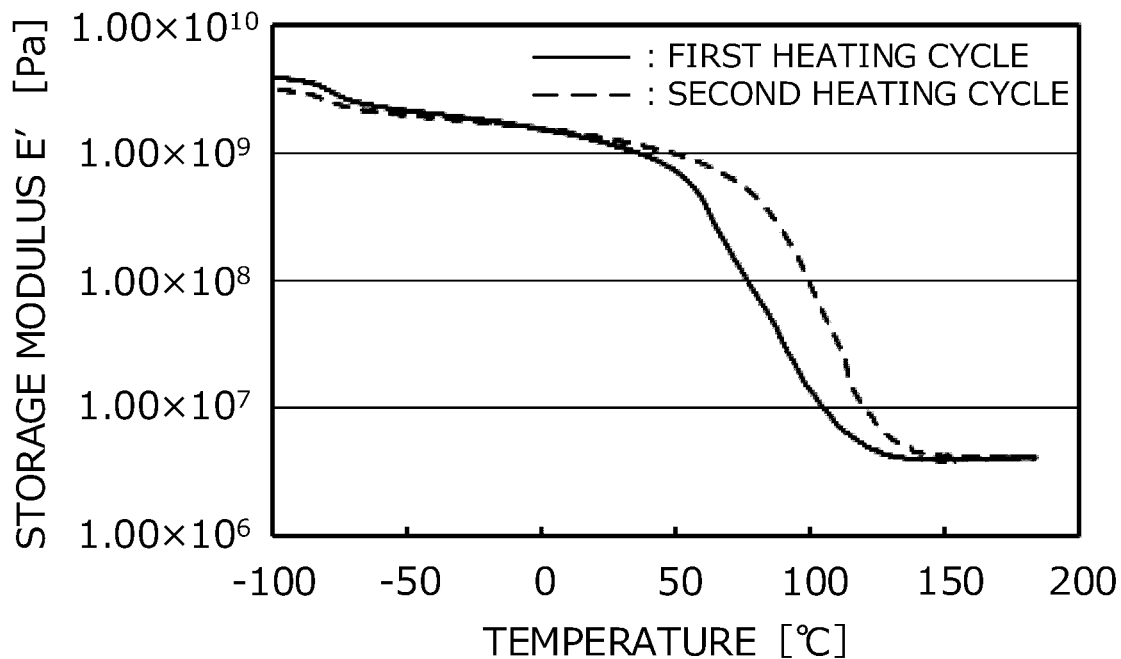
FIG. 5 is a graphic diagram presenting an example of measurement results of dynamic viscoelasticity of a room temperature curing adhesive with uncured portions.

In the storage modulus E' of the room temperature curing adhesive with uncured portions, a curve of a first heating cycle and a curve of a second heating cycle are not consistent. FIG. 5 presents results of the dynamic viscoelasticity measurement of Y600 manufactured by Cemedine Co., Ltd. as an example of the room temperature curing adhesive with uncured portions. It is clear from the dynamic viscoelasticity measurement results of Y600 manufactured by Cemedine Co., Ltd. presented in FIG. 5 that hysteresis can be confirmed by repeated heating through temperature cycling. In other words, the elastic modulus of the adhesive changes, and it can be confirmed that there are uncured portions remaining in Y600.

On the other hand, in the room temperature curing adhesive without uncured portions, discrepancy in the storage modulus curves between the first and second heating cycles is within 20° C. or the storage modulus curves of the first and second heating cycles are consistent. Results of the dynamic viscoelasticity measurement of Super XG manufactured by Cemedine Co., Ltd. are presented in FIG. 6 as an example of the room temperature curing adhesive without uncured portions. It is clear from the dynamic viscoelasticity measurement results of Super XG manufactured by Cemedine Co., Ltd. presented in FIG. 6 that there is no hysteresis even after the repeated heating through temperature cycling, and it can be confirmed that there are no uncured portions. Thus, whether the uncured portions exist is clear from the dynamic viscoelasticity measurement results, as is evident by comparing FIG. 5 and FIG. 6.

Whether the uncured portions of the adhesive exist can be confirmed by the dynamic viscoelasticity measurement. When the discrepancy in the storage modulus E' curves between the first and second heating cycles is within 20° C., the adhesive can be regarded as the room temperature curing adhesive without uncured portions.

When determining whether or not an adhesive that is already cured is the room temperature curing adhesive with uncured portions, the above method can be used to check if uncured portions remain in the target adhesive.

As shown in the following examples, even if the thickness of the metal layer 11 or the thickness of the FRP layer 13 changes, no warpage will occur under any conditions if the room temperature curing adhesive without uncured portions is used for laminating the metal layer 11 and the FRP layer 13. This is true even when the room temperature curing adhesive without uncured portions also serves as the resin layer 12.

The resin layer 12 and the FRP layer 13 may be directly bonded to each other or laminated together by the adhesive layer 15 when the resin layer 12 is formed by the room temperature curing adhesive. The adhesion between the metal layer 11 and the resin layer 12 can only be fully effective when the room temperature curing adhesive is used. This is true even when a plurality of metal layers 11 are used to fabricate the metal-FRP composites 1, 2, 3, such as sandwiching the FRP layer 13 with the plurality of metal layers 11.

The adhesive used to constitute the adhesive layer 15 may be the room temperature curing adhesive similar to that used for the adhesive layer 14. The adhesive layer 15 may be formed by a thermosetting adhesive or by heat fusion using a thermoplastic resin. In the case of the thermosetting adhesive or the heat fusion using the thermoplastic resin, the resin layer 12 and the FRP layer 13 are bonded in advance with the adhesive layer 15 therebetween, and then the resin layer 12, the adhesive layer 15, and the FRP layer 13 are bonded to the metal layer 11 at room temperature.

According to the above-mentioned embodiment, the metal-FRP composite 1, metal-FRP composite 2, metal-FRP composite 3, or metal-FRP composite 4 that is free from thermal stress is provided. This is also true even when the plurality of metal layers 11 are used to fabricate the metal-FRP composite 1, 2, 3, or 4, such as sandwiching the FRP layer 13 with the plurality of metal layers 11.

When the metal-FRP composite is subjected to the baking process after electrodeposition coating, the metal expands during heating, and the uncured portions of the resin layer 12 and the adhesive layers 14, 15 flow and are additionally cured. Therefore, thermal stress is temporarily generated in the metal-FRP composite after the metal-FRP composite is cooled. However, the resin layer 12 deforms to adjust the thermal stress mismatch between the metal layer 11 and the FRP layer 13, resulting in that the thermal stress difference is eliminated and the metal-FRP composite is not deformed. When the room temperature curing adhesives without uncured portions is used in the formation of the resin layer 12 and the adhesive layers 14 and 15, thermal stress does not occur even after the baking process, and the deformation of the metal-FRP composite can be suppressed more reliably.

<Regarding Measurement Method of Thickness>

The thicknesses of the metal layer 11, the resin layer 12, the FRP layer 13, and the adhesive layers 14, 15 can be measured according to a cross-sectional method of an optical method in JIS K 5600-1-7, Section 5.4, as follows. That is, a room temperature curing resin that can be embedded without gaps free from harmful effects on a specimen is used, and low viscosity Epo Mount 27-777 manufactured by Refine Tec Ltd. is used as a main agent and 27-772 as a curing agent to embed the specimen. The specimen is cut at a point to be observed using a cutting machine to be parallel to a thickness direction to produce a cross-section, and polish the cross-section using abrasive paper with a grit specified in JIS R 6252 or 6253 (for example, 280 grit, 400 grit, or 600 grit) to fabricate an observation surface. When an abrasive material is used, the observation surface is polished by using diamond paste or similar paste of appropriate grade to fabricate the observation surface. If necessary, buffing may also be performed to smooth a surface of the specimen to a condition that is acceptable for observation.

Figure 7:
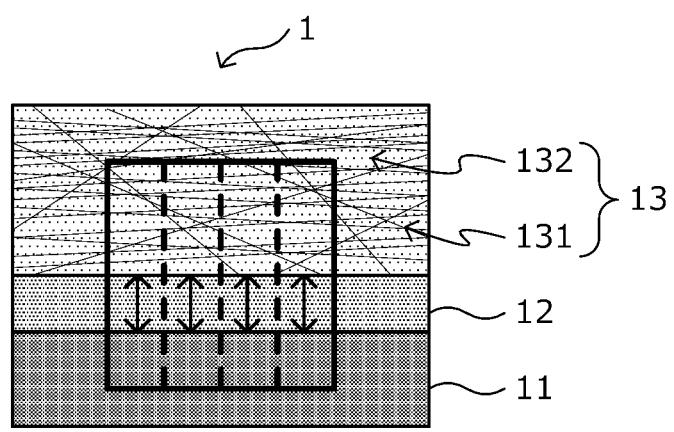
FIG. 7 is an explanatory diagram for explaining a thickness measurement method.

A microscope with an illumination system appropriate for providing optimal image contrast and capable of measuring with an accuracy of 1 µm (for example, BX51 manufactured by Olympus Corporation) is used, and a size of a field of view is selected to be 300 µm. The size of the field of view may be changed so that respective thicknesses can be checked (for example, if the thickness of the FRP layer 13 is 1 mm, the size of the field of view may be changed so that the thickness can be checked). For example, when measuring the thickness of the resin layer 12 of the metal-FRP composite 1 as illustrated in FIG. 7, the viewing field is divided into four equal parts as illustrated in FIG. 7, the thickness of the resin layer 12 is measured at the center of a width direction of each fractional point, and an average thickness is used as the thickness in that field of view. Five different points are selected from the viewing field, each viewing field is divided into four equal parts, the thickness is measured at each fraction, and the average value is calculated. It is recommended that adjacent viewing fields are selected to be separated by 3 cm or more. The thickness of the resin layer 12 can be calculated by further averaging the average values at these five points. The thicknesses of the metal layer 11, the FRP layer 13, and the adhesive layers 14, 15 can also be measured in the same way as the measurement of the thickness of the resin layer 12.

When boundary surfaces of the metal layer 11, the resin layer 12, the FRP layer 13, and the adhesive layers 14, 15 are relatively clear, the thickness of the resin layer 12 can be measured using the above method. However, the boundary surface between the resin layer 12 and the FRP layer 13 is not always clear. When the boundary surface is unclear, the boundary surface may be identified by the following method. That is, the metal-FRP composite is scraped off from the metal layer 11 side using a grinder or the like to which a diamond grindstone is attached. The cutting surface is then observed under the microscope described above, and an area ratio of a fiber portion constituting the reinforced fiber material (the area ratio of the fiber portion to a total area of the viewing field) is measured. The area ratios may be measured in a plurality of viewing fields, and an arithmetic mean value of the measured values may be used as the area ratio of the fiber portion. Then, the cutting surface when the area ratio of the fiber portion exceeds 10% may be used as the boundary surface between the resin layer 12 and the FRP layer 13.

EXAMPLES

Hereinafter, the metal-FRP composite of the present invention will be concretely explained in detail, presenting examples and comparative examples. However, the examples presented below are only examples of the metal-FRP composite of the present invention, and the metal-FRP composite of the present invention is not limited to the following examples.

Example 1

Figure 8:
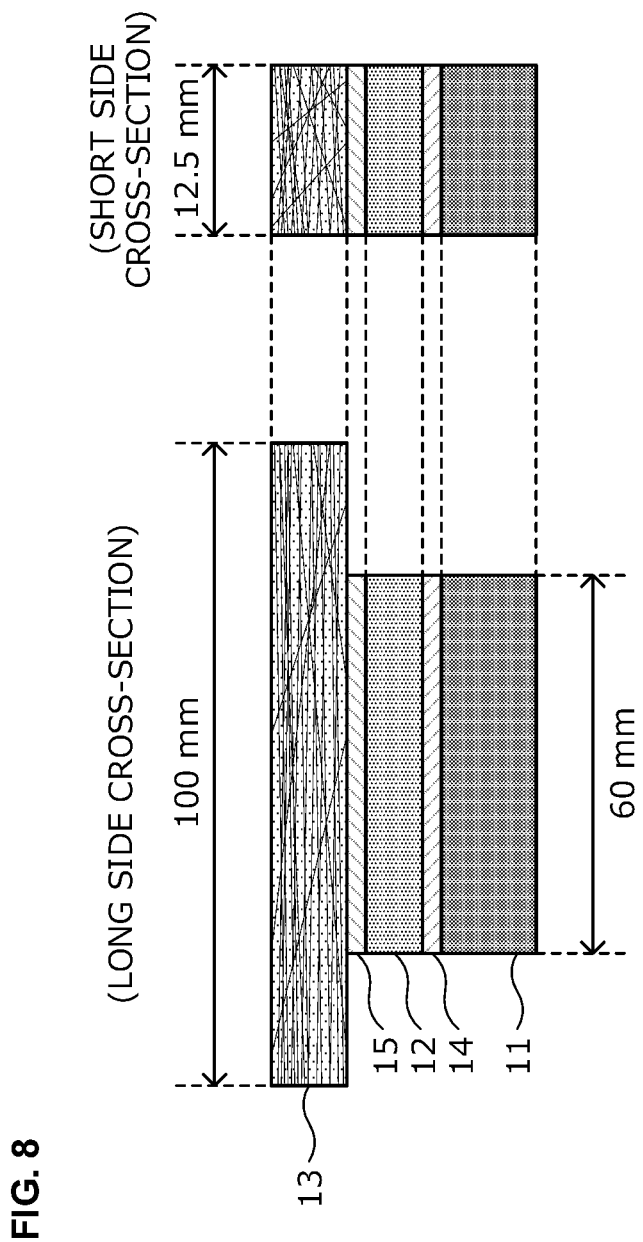
FIG. 8 is an explanatory diagram schematically illustrating a shape of a fabricated strip specimen.

FIG. 8 illustrates a schematic diagram schematically illustrating a size of a strip specimen fabricated in this example. FIG. 8 illustrates the size of the strip specimen in an exaggerated manner and does not reflect exact values.

A steel sheet (GA steel sheet manufactured by Nippon Steel Corporation) with a thickness of 0.40 mm was prepared as the metal layer 11, and CFRP (manufactured by Nittetsu Chemical & Materials Co., Ltd.: Cloth material (Vf60) using a phenoxy resin as the matrix resin) with a thickness of 1.00 mm was prepared as the FRP layer 13 to fabricate the strip specimen having the size as schematically illustrated in FIG. 8. A layer formed by a polyurea resin (manufactured by Nittetsu Chemical & Materials Co., Ltd.: Polyurea Putty FU-Z) with a thickness of 0.50 mm was prepared as the resin layer 12. The dynamic viscoelasticity measurement of the resin layer was performed in accordance with the above conditions using a viscoelasticity measurement apparatus (DMA7100 manufactured by Hitachi High-Tech Science Corporation), and as a result, an elastic modulus of the resin layer was found to be 50 MPa.

A room temperature curing adhesive (Super XG manufactured by Cemedine Co., Ltd.) was applied to the steel sheet and laminated to the above resin layer. Further, the room temperature curing adhesive (Super XG manufactured by Cemedine Co., Ltd.) was applied to a surface of the resin layer on an opposite side of the steel sheet, and laminated to the CFRP above. The resulting laminated body was then held at room temperature for 12 hours to cure the room temperature curing adhesive to thereby obtain the strip specimen. Next, a baking process is simulated, and the obtained strip specimen was exposed to an atmosphere at 180° C. for 20 minutes.

Figure 6:
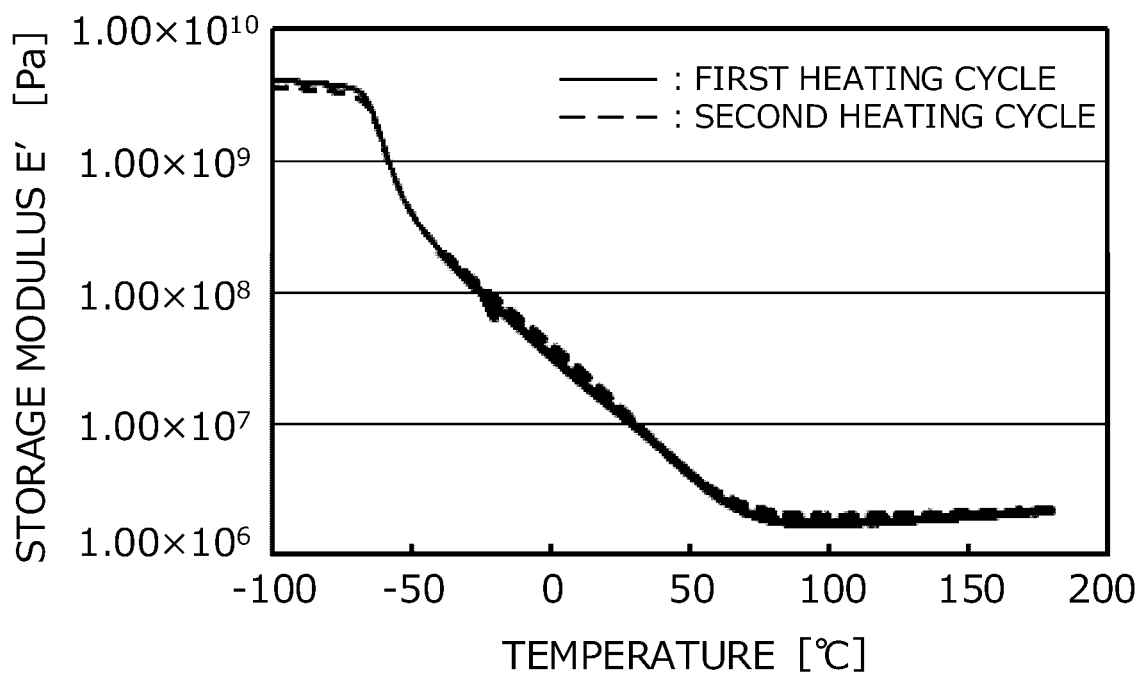
FIG. 6 is a graphic diagram presenting an example of measurement results of dynamic viscoelasticity of a room temperature curing adhesive without uncured portions.

Dynamic viscoelasticity measurement results of Super XG manufactured by Cemedine Co., Ltd., which is the room temperature curing adhesive used, are as presented in FIG. 6. It can be confirmed that the room temperature curing adhesive is the room temperature curing adhesive without uncured portions from the fact that there is no hysteresis due to repeated heating in the dynamic viscoelasticity measurement results presented in FIG. 6 (in other words, the discrepancy in the storage modulus curves is within 20° C.). The elastic modulus of Super XG manufactured by Cemedine Co., Ltd. was found to be 10 MPa from the obtained dynamic viscoelasticity measurement results.

Figure 9:
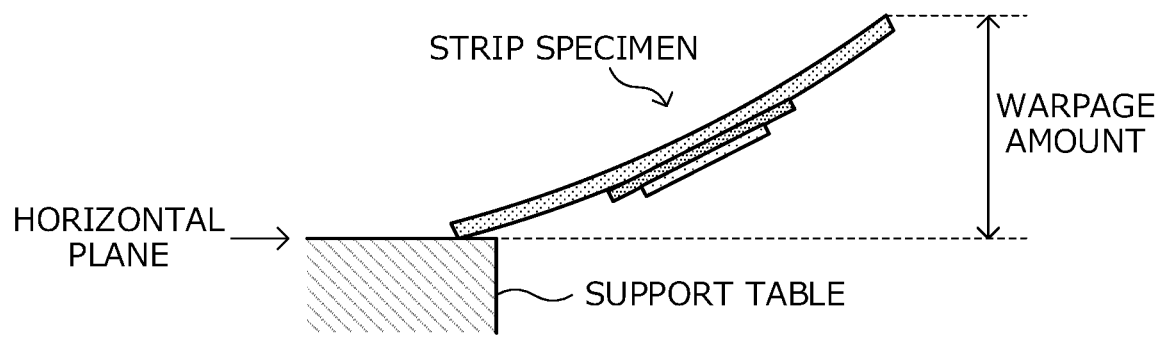
FIG. 9 is an explanatory diagram schematically illustrating a method of measuring a deformation amount of the strip specimen after exposure.

One end portion of the strip specimen after exposure under the above conditions simulating the baking process was fixed to a support table as schematically illustrated in FIG. 9, and a deformation amount of the entire strip specimen was evaluated as bouncing displacement of the end portion. The results obtained are listed in Table 1 below.

In Table 1 below, when an absolute value of the deformation amount was 0.250 mm or less, it was classified as no deformation and evaluated as grade "B". When the deformation was particularly small such as the deformation amount of less than 0.100 mm, it was evaluated as grade "A". On the other hand, when the absolute value of the deformation amount was more than 0.250 mm, it was classified as having deformation and was evaluated as grade "C".

Whether a resin layer crosslinked structure exists was also verified as follows.

That is, it is focused on whether or not a loss coefficient exceeds 1 in a temperature range between a glass transition point or a melting point or more and less than a decomposition temperature of a resin used for the resin layer 12 in the DTMA curve obtained from the dynamic viscoelasticity measurement. In such a case, it can be determined that the resin layer does not have the crosslinked structure when the loss coefficient exceeds 1, and the resin layer has the crosslinked structure when the loss coefficient does not exceed 1 in the above temperature range. When the crosslinked structure is judged to exist based on the above method, it was evaluated as grade "A", and when the crosslinked structure is judged not to exist, it was evaluated as grade "B".

Example 2

A strip specimen was fabricated in the same manner as in Example 1, except that the thickness of CFRP used was set to 0.50 mm. The obtained strip specimen was exposed in the same way as in Example 1, and then evaluated in the same way as in Example 1.

Example 3

The room temperature curing adhesive (Super XG manufactured by Cemedine Co., Ltd.) was applied to a steel sheet with a thickness of 0.40 mm as in Example 1, so that the thickness after curing would be 0.50 mm, and laminated to CFRP with a thickness of 1.00 mm as in Example 1. The resulting laminated body was held at room temperature for 12 hours to cure the room temperature curing adhesive, and a strip specimen in a three-layer structure was fabricated. The elastic modulus obtained from the dynamic viscoelasticity measurement of the room temperature curing adhesive used was 10 MPa, as described above, so the layer formed by the room temperature curing adhesive satisfied both the function as the resin layer and the adhesive function. The obtained strip specimen was evaluated in the same manner as in Example 1.

Example 4

A strip specimen was fabricated in the same manner as in Example 1, except that the thickness of the steel sheet used was changed to 1.60 mm. The obtained strip specimen was exposed in the same manner as in Example 1, and then evaluated in the same manner as in Example 1.

Example 5

A strip specimen was fabricated in the same manner as in Example 1, except that the room temperature curing adhesive used was changed to a room temperature curing adhesive with uncured portions (Y600 manufactured by Cemedine Co., Ltd.). The obtained strip specimen was exposed in the same manner as in Example 1, and then evaluated in the same manner as in Example 1. The dynamic viscoelasticity measurement results of the room temperature curing adhesive used in this example are as presented in FIG. 5. It was confirmed that the room temperature curing adhesive is the room temperature curing adhesive with uncured portions by the presence of hysteresis due to repeated heating in the dynamic viscoelasticity measurement results presented in FIG. 5.

Example 6

A strip specimen was fabricated in the same manner as in Example 1, except that a layer formed by a polyester elastomer (Hytrel 4057WL20 manufactured by Du Pont-Toray Co., Ltd.) was used as the resin layer. The obtained strip specimen was exposed in the same manner as in Example 1, and then evaluated in the same manner as in Example 1. The dynamic viscoelasticity measurement was performed on the polyester elastomer used, and the elastic modulus was found to be 90 MPa.

Example 7

A strip specimen was fabricated in the same manner as in Example 6. However, the resin layer and the FRP layer were bonded by heat fusion in advance, and then the obtained bonded body was bonded to the steel sheet with the room temperature curing adhesive, as opposed to Example 6. A strip specimen in a four-layer structure without the adhesive layer between the resin layer and CFRP was thereby fabricated. The obtained strip specimen was then exposed in the same manner as in Example 1, and then evaluated in the same manner as in Example 1.

Example 8

A strip specimen was fabricated in the same manner as in Example 1, except that an aluminum alloy (A6061 which was specified in JIS H4000:2014) with a thickness of 0.40 mm was used as the metal layer. The obtained strip specimen was exposed in the same manner as in Example 1, and then evaluated in the same manner as in Example 1.

Example 9

A strip specimen was fabricated in the same manner as in Example 1, except that a layer formed by SIS (styrene isoprene styrene, SIS5229 manufactured by JSR Corporation) was used as the resin layer. The obtained strip specimen was exposed in the same manner as in Example 1, and then evaluated in the same manner as in Example 1. The dynamic viscoelasticity measurement was performed on the SIS used, and the elastic modulus was found to be 1 MPa.

Example 10

A strip specimen was fabricated in the same manner as in Example 1, except that a layer formed by a polyurethane resin (MG5000 manufactured by E-Tech Corporation) was used as the resin layer. The obtained strip specimen was exposed in the same way as in Example 1, and then evaluated in the same way as in Example 1. The dynamic viscoelasticity measurement was performed on the polyurethane resin used, and the elastic modulus was found to be 950 MPa.

Example 11

A strip specimen was fabricated in the same manner as in Example 1, except that a layer formed by a methacrylic resin (PLEXUS MA530 manufactured by Illinois Tool Works, Inc.) was used as the resin layer. The obtained strip specimen was exposed in the same manner as in Example 1, and then evaluated in the same manner as in Example 1. The dynamic viscoelasticity measurement was performed on the methacrylic resin used, and the elastic modulus was found to be 414 to 483 MPa.

Example 12

A strip specimen was fabricated in the same manner as in Example 1, except that a layer formed by a polyester elastomer (Hytrel 4057WL20 manufactured by Du Pont-Toray Co., Ltd.) was used as the resin layer, and the thickness of the layer was set to 2.50 mm. The obtained strip specimen was exposed in the same manner as in Example 1, and then evaluated in the same manner as in Example 1. The dynamic viscoelasticity measurement was performed on the polyester elastomer used, and the elastic modulus was found to be 90 MPa.

Example 13

A strip specimen was fabricated in the same manner as in Example 1, except that a layer formed by a polyester elastomer (Hytrel 4057WL20 manufactured by Du Pont-Toray Co., Ltd.) with a thickness of 0.10 mm was used as the resin layer with respect to a titanium alloy (manufactured by Nippon Steel Corporation) with a thickness of 0.10 mm. The obtained strip specimen was exposed in the same manner as in Example 1, and then evaluated in the same manner as in Example 1. The dynamic viscoelasticity measurement was performed on the polyester elastomer used, and the elastic modulus was found to be 90 MPa.

Example 14

A strip specimen was fabricated in the same manner as in Example 1, except that a layer formed by a polyester elastomer (Hytrel 4057WL20, manufactured by Du Pont-Toray Co., Ltd.) with a thickness of 0.10 mm was used as the resin layer with respect to a magnesium alloy (manufactured by Nilaco Corporation) with a thickness of 0.10 mm. The obtained strip specimen was exposed in the same manner as in Example 1, and then evaluated in the same manner as in Example 1. The dynamic viscoelasticity measurement was performed on the polyester elastomer used, and the elastic modulus was found to be 90 MPa.

Example 15

A strip specimen was fabricated in the same manner as in Example 1, except that the room temperature curing adhesive used was changed to a room temperature curing adhesive without uncured portions (High Super 30 manufactured by Cemedine Co., Ltd.). The obtained strip specimen was exposed in the same manner as in Example 1, and then evaluated in the same manner as in Example 1. It was confirmed that the room temperature curing adhesive had no uncured portions by separately measuring the dynamic viscoelasticity of the room temperature curing adhesive used in this example.

Comparative Example 1

A strip specimen in a three-layer structure was fabricated in the same manner as in Example 7, except that the metal layer, the resin layer, and CFRP were composited with each other by heat fusion of the resin layer without using a room temperature curing adhesive. The obtained strip specimen was exposed in the same manner as in Example 1, and then evaluated in the same manner as in Example 1.

Comparative Example 2

A strip specimen was fabricated in the same manner as in Example 1, except that a layer formed by acid-modified polypropylene (QE060 manufactured by Mitsui Chemicals, Inc.) was used as the resin layer. The obtained strip specimen was exposed in the same manner as in Example 1, and then evaluated in the same manner as in Example 1. The dynamic viscoelasticity measurement was performed on the acid-modified polypropylene (hereinafter, sometimes referred to as "acid-modified PP") used in this example, and the elastic modulus was found to be 1100 MPa.

Comparative Example 3

A strip specimen was fabricated in the same manner as in Example 1, except that a resin layer with a thickness of 3.0 mm, formed by a polyester elastomer (Hytrel 4057WL20 manufactured by Toray Dupont Co.) was formed. The obtained strip specimen was exposed in the same manner as in Example 1, and then evaluated in the same manner as in Example 1.

Conditions for fabricating the strip specimens in Examples 1 to 15 and Comparative Examples 1 to 3 and the verification results obtained were summarized in Table 1-1 and Table 1-2 below.

TABLE 1-1

| | No. | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | COMPARATIVE EXAMPLE 1 | COMPARATIVE EXAMPLE 2 | COMPARATIVE EXAMPLE 3 |
|---|---|---|---|---|---|---|---|---|---|---|---|---|---|---|
| METAL LAYER | | TYPE | STEEL SHEET | STEEL SHEET | STEEL SHEET | STEEL SHEET | STEEL SHEET | STEEL SHEET | STEEL SHEET | ALUMINUM ALLOY PLATE | STEEL SHEET | STEEL SHEET | STEEL SHEET | STEEL SHEET |
| | | THICKNESS T1 [mm] | 0.40 | 0.40 | 0.40 | 1.60 | 0.40 | 0.40 | 0.40 | 0.50 | 0.40 | 0.40 | 0.40 | 0.40 |
| ADHESIVE LAYER | | TYPE | SUPER XG | SUPER XG | SUPER XG (WITHOUT UNCURED PORTION) | SUPER XG | Y600 | SUPER XG | SUPER XG | SUPER XG | SUPER XG | — | SUPER XG | SUPER XG |
| | | EXISTENCE OF UNCURED PORTION | NO | NO | — | NO | YES | NO | NO | NO | NO | — | NO | NO |
| RESIN LAYER | | TYPE | POLYUREA RESIN | POLYUREA RESIN | — | POLYUREA RESIN | POLYUREA RESIN | POLYESTER ELASTOMER | POLYESTER ELASTOMER | POLYUREA RESIN | SIS | POLYESTER ELASTOMER | ACID-MODIFIED PP | POLYESTER ELASTOMER |
| | | THICKNESS [mm] | 0.50 | 0.50 | 0.50 | 0.50 | 0.50 | 0.50 | 0.50 | 0.50 | 0.20 | 0.50 | 0.50 | 3.00 |
| | | RATIO OF THICKNESS TO THICKNESS OF METAL LAYER | 1.250 | 1.250 | 1.250 | 0.313 | 1.250 | 1.250 | 1.250 | 1.000 | 0.500 | 1.250 | 1.250 | 7.500 |
| | | ELASTIC MODULUS E [MPa] | 50 | 50 | 10 | 50 | 50 | 90 | 90 | 50 | 1 | 90 | 1100 | 90 |
| ADHESIVE LAYER | | TYPE | SUPER XG | SUPER XG | — | SUPER XG | Y600 | SUPER XG | — | SUPER XG | SUPER XG | — | SUPER XG | SUPER XG |
| | | EXISTENCE OF UNCURED PORTION | NO | NO | — | NO | YES | NO | — | NO | NO | — | NO | NO |

TABLE 1-1-continued

| | No. | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | COMPARATIVE EXAMPLE 1 | COMPARATIVE EXAMPLE 2 | COMPARATIVE EXAMPLE 3 |
|---|---|---|---|---|---|---|---|---|---|---|---|---|---|
| FRP LAYER | TYPE | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP |
| | THICKNESS [mm] | 1.00 | 0.50 | 1.00 | 1.00 | 1.00 | 1.00 | 1.00 | 1.00 | 1.00 | 1.00 | 1.00 | 1.00 |
| LAYER STRUCTURE OF COMPOSITE | | FIVE-LAYER STRUCTURE | FIVE-LAYER STRUCTURE | THREE-LAYER STRUCTURE | FIVE-LAYER STRUCTURE | FIVE-LAYER STRUCTURE | FIVE-LAYER STRUCTURE | FOUR-LAYER STRUCTURE | FIVE-LAYER STRUCTURE | FIVE-LAYER STRUCTURE | THREE-LAYER STRUCTURE | FIVE-LAYER STRUCTURE | FIVE-LAYER STRUCTURE |
| DEFORMATION AMOUNT | SIZE [mm] | 0.047 | 0.250 | 0.047 | 0.000 | 0.074 | 0.160 | 0.160 | 0.120 | 0.20 | 1.100 | 2.050 | −2.300 |
| | EVALUATION | A | B | A | A | A | B | B | B | B | C | C | C |
| EXISTENCE OF RESIN LAYER CROSSLINKED STRUCTURE | | A | A | A | A | A | B | B | A | B | B | B | B |

TABLE 1-2

| No. | | EXAMPLE 10 | EXAMPLE 11 | EXAMPLE 12 | EXAMPLE 13 | EXAMPLE 14 | EXAMPLE 15 |
|---|---|---|---|---|---|---|---|
| METAL LAYER | TYPE | STEEL SHEET | STEEL SHEET | STEEL SHEET | TITANIUM ALLOY | MAGNESIUM ALLOY | STEEL SHEET |
| | THICKNESS T1 [mm] | 0.40 | 0.40 | 0.40 | 0.10 | 0.10 | 0.40 |
| ADHESIVE LAYER | TYPE | SUPER XG | SUPER XG | SUPER XG | SUPER XG | SUPER XG | HIGH SUPER 30 |
| | EXISTENCE OF UNCURED PORTION | NO | NO | NO | NO | NO | NO |
| RESIN LAYER | TYPE | POLY-URETHANE RESIN | METH-ACRYLIC RESIN | POLY-ESTER ELASTOMER | POLY-ESTER ELASTOMER | POLY-ESTER ELASTOMER | POLY-ESTER ELASTOMER |
| | THICKNESS [mm] | 0.50 | 0.50 | 2.50 | 0.10 | 0.10 | 0.50 |
| | RATIO OF THICKNESS TO THICKNESS OF METAL LATER | 1.25 | 1.25 | 6.25 | 1.00 | 1.00 | 1.25 |
| | ELASTIC MODULUS E [MPa] | 950 | 414~483 | 90 | 90 | 90 | 90 |
| ADHESIVE LAYER | TYPE | SUPER XG | SUPER XG | SUPER XG | SUPER XG | SUPER XG | HIGH SUPER 30 |
| | EXISTENCE OF UNCURED PORTION | NO | NO | NO | NO | NO | NO |
| FRP LAYER | TYPE | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP | CLOTH MATERIAL PHENOXY RESIN CFRP |
| | THICKNESS [mm] | 1.00 | 1.00 | 1.00 | 1.00 | 1.00 | 1.00 |
| LAYER STRUCTURE OF COMPOSITE | | FIVE-LAYER STRUCTURE | FIVE-LAYER STRUCTURE | FIVE-LAYER STRUCTURE | FIVE-LAYER STRUCTURE | FIVE-LAYER STRUCTURE | FIVE-LAYER STRUCTURE |
| DEFORMATION AMOUNT | SIZE [mm] | 0.243 | 0.200 | 0.193 | 0.051 | 0.058 | 0.077 |
| | EVALUATION | B | B | B | A | A | A |
| EXISTENCE OF RESIN LAYER | | A | A | B | B | B | B |

(Results and Discussion)

After bonding the metal layer, the resin layer, and CFRP to each other without generating thermal stress by bonding an interface between the metal layer and the resin layer at room temperature, uncured portions in the room temperature curing adhesive flow due to heating in the baking process, then the adhesive additionally cures while the metal expands, causing a thermal stress difference after cooling. However, as it is clear from Table 1-1 and Table 1-2 above, it is considered that deformation of the entire strip specimen was extremely small because the resin layer adjusts the thermal stress differences in each of the cases of Examples 1 to 15.

On the other hand, in Comparative Example 1, the adhesive formed by the thermoplastic resin flowed greatly during the baking process, and upon cooling, the metal layer solidified with expansion, which was thought to have caused larger deformation than in Examples 1 to 15. In Comparative Example 2 using the resin layer with the high elastic modulus, the resin layer was not easily deformed, and the effect of adjusting the thermal stress difference was low, which was thought to have caused the large deformation. In Comparative Example 3, although the resin layer with the appropriate elastic modulus was inserted, the thickness of the resin layer was too thick and a relationship between a ratio of the thickness of the resin layer to the thickness of the metal layer was no longer satisfied. As a result, the effect of shrinkage of the resin layer became larger, which was thought to have caused the large deformation.

In the foregoing, the preferred embodiments of the present invention have been explained in detail while referring to the attached drawings, but the present invention is not limited to such examples. It is apparent that a person ordinary skilled in the art to which the present invention pertains is able to devise various variation or modification examples within the scope of the technical spirit described in the claims, and it should be understood that such examples belong to the technical scope of the present invention as a matter of course.

EXPLANATION OF CODES 1, 2, 3, 4 metal-fiber reinforced resin material composite (metal-FRP composite)
11 metal layer
12 resin layer
13 FRP layer
14, 15 adhesive layer
131 reinforced fiber material
132 matrix resin

What is claimed is:

1. A metal-fiber reinforced resin material composite having a laminated structure of three or more layers, comprising at least:
   a metal layer;
   a fiber-reinforced resin material layer holding a reinforced fiber material in a layer constituted by a matrix resin; and
   a resin layer located between the metal layer and the fiber-reinforced resin material layer, wherein
   the resin layer is a layer constituted by a room temperature curing adhesive or a layer constituted by a predetermined resin and the room temperature curing adhesive, the predetermined resin is a curable resin or a thermoplastic resin, the room temperature curing adhesive is a room temperature curing adhesive without uncured portions, an elastic modulus E of the resin layer is more than 0.1 MPa and 1000 MPa or less, and a thickness of the resin layer is 0.005 times or more and less than 7.500 times a thickness of the metal layer.

2. The metal-fiber reinforced resin material composite according to claim 1, wherein the elastic modulus E of the resin layer is 1 MPa or more and 500 MPa or less.

3. The metal-fiber reinforced resin material composite according to claim 1, wherein the elastic modulus E of the resin layer is 10 MPa or more and 100 MPa or less.

4. The metal-fiber reinforced resin material composite according to claim 1, wherein the resin layer is made of the curable resin.

5. The metal-fiber reinforced resin material composite according to claim 1, wherein the resin layer is bonded to the metal layer with the room temperature curing adhesive.

6. The metal-fiber reinforced resin material composite according to claim 1, wherein the resin layer is bonded to the fiber-reinforced resin material layer with the room temperature curing adhesive.

7. The metal-fiber reinforced resin material composite according to claim 1, wherein the metal layer is formed by a steel material, a stainless material, a titanium material, an aluminum alloy material, or a magnesium alloy material.

8. The metal-fiber reinforced resin material composite according to claim 1, wherein the metal layer is formed by a steel sheet.

9. The metal-fiber reinforced resin material composite according to claim 1, wherein the room temperature curing adhesive is a room temperature curing adhesive without uncured portions after curing at room temperature.

* * * * *